United States Patent [19]

Geisinger

[11] 4,286,367
[45] Sep. 1, 1981

[54] APPARATUS FOR INSERTING A RESILIENT BAND ON A CONTAINER

[76] Inventor: Wolfgang Geisinger, 180 rue Paradis, Rosemere, Quebec, Canada

[21] Appl. No.: 131,412

[22] Filed: Mar. 18, 1980

[51] Int. Cl.³ .............................................. B23P 19/02
[52] U.S. Cl. ....................................................... 29/235
[58] Field of Search ................................. 29/235, 282

[56] References Cited

U.S. PATENT DOCUMENTS

| 3,036,371 | 5/1962 | Gray et al. ............................. 29/235 |
| 4,212,096 | 7/1980 | Saito et al. ............................ 29/235 |

FOREIGN PATENT DOCUMENTS 815829 4/1937 France ....................................... 29/235

Primary Examiner—James L. Jones, Jr.
Attorney, Agent, or Firm—Cushman, Darby & Cushman

[57] ABSTRACT

An apparatus for inserting a resilient band on a container, which comprises a support member adapted to receive on its top wall the container, a first set of segments arranged circumferentially about the support member, a second set of segments arranged circumferentially about the first set of segments below the top wall of the first set of segments to define therewith a band-receiving area, and a pair of springs opposing, in one case, the downward movement of the support member and, in the other case, the downward movement of the first set of segments; the second spring has a higher spring modulus than that of the first spring so that downward movement of the container on the support member causes, first, a radial outward movement of the first set of segments to stretch the band until the container contacts the first set of segments whereupon the first set of segments moves downward within the second set of segments and the band moves in engagement onto the container.

6 Claims, 5 Drawing Figures

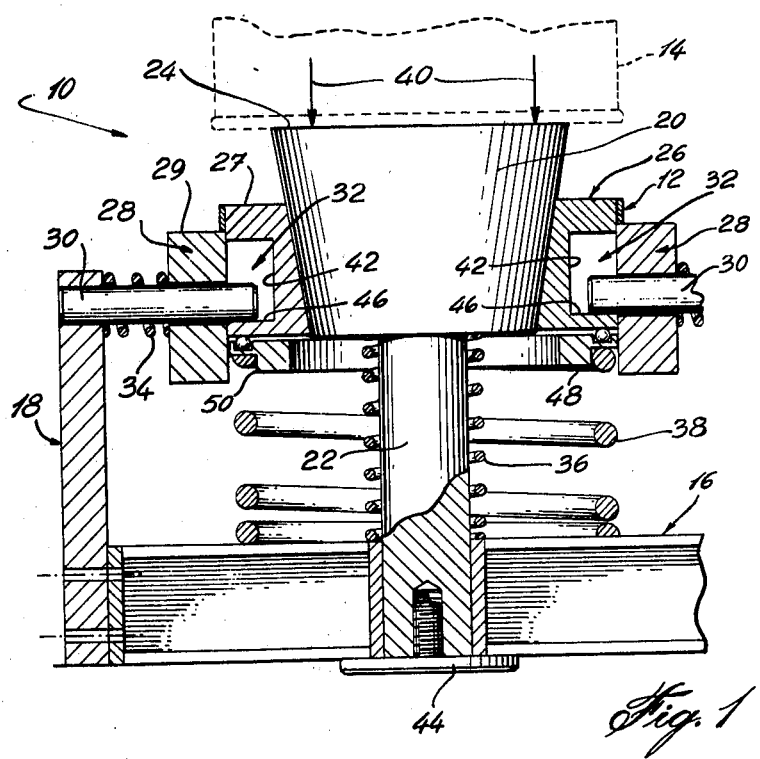

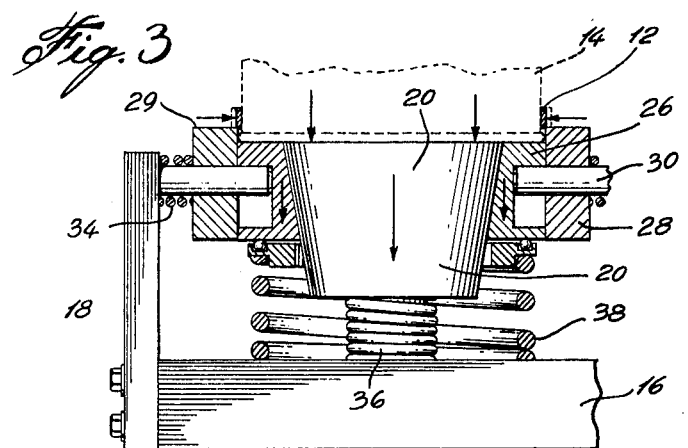
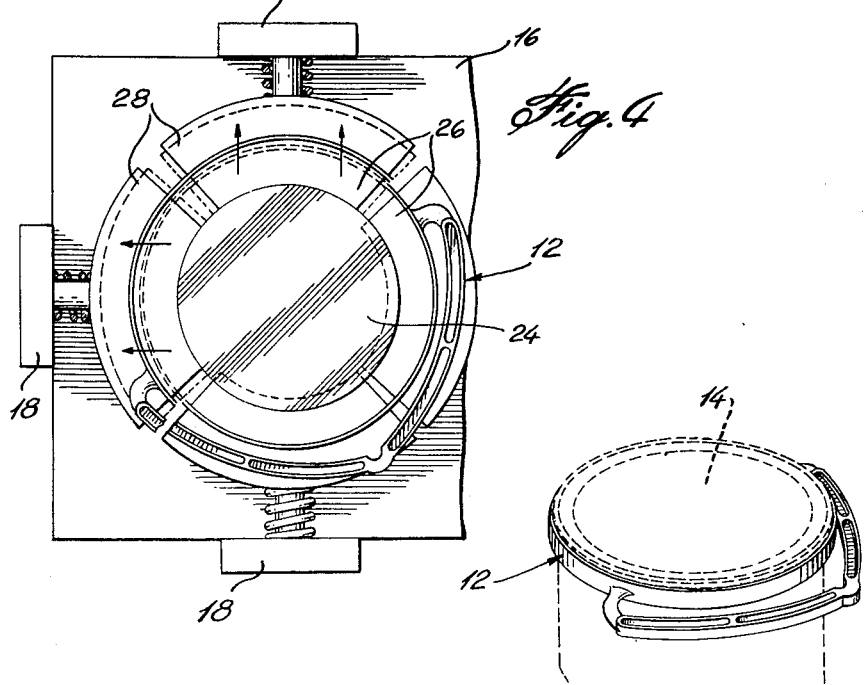

APPARATUS FOR INSERTING A RESILIENT BAND ON A CONTAINER

FIELD OF THE INVENTION

The present invention relates to an apparatus for inserting a resilient band on a container and, more particularly, relates to an apparatus for inserting a plastic bail band on a metallic can or similar container for a variety of products.

BACKGROUND OF THE INVENTION

Cans to which the present invention relates, for example, paint cans, are, in most cases, equipped with a metallic bail handle which is hooked to two diametrically opposite elements welded to the body wall of the can. One disadvantage of a metallic bail handle is that the wall of the can must first be treated and coated to avoid welding with corrosion parts of the can. Additionally, the label that goes on to the body wall must be so shaped as to fit the contour of the welded parts of the container wall.

Some containers equipped with a plastic bail band having a semi-circular shaped handle to support the container are known. One example of such a handle is found described in applicant's Canadian Pat. No. 1,019,705 issued Oct. 25, 1977 or in applicant's co-pending patent application Ser. No. 131,130 filed Aug. 22, 1979.

OBJECTS AND STATEMENT OF THE INVENTION

It is an object of the present invention to provide an apparatus which stretches a plastic band so that it may then be inserted into tight engagement with the container.

It is a further object of the present invention whereby the insertion of the plastic band on the container may be readily carried out and which is relatively simple and easily effected.

The present invention therefore relates to an apparatus for inserting a resilient band on a container adjacent one peripheral end thereof which comprises in its broadest aspect: a support member adapted to receive thereon a container and adapted to be forced downward by the container, the support member having a tapered side wall and a top wall of a size smaller than that of the container; a first set of segments arranged circumferentially about the support member, each segment having a top wall extending below the top wall of the support member and an inner wall in sliding contact with the side wall of the support member, the segments being radially displaceable relative to the support member as said support member is forced downward; a second set of segments arranged circumferentially about the first set of segments, each segment of the second set having a top wall extending below the top wall of the first set of segments to define therewith a band-receiving area; means urging the second set of segments exteriorly against the first set of segments; first spring means opposing downward movement of the support member; second spring means opposing downward movement of the first set of segments, the second spring means having a spring modulus higher than that of the first spring means whereby downward movement of the container on the support member causes, first, a radial movement only of the first set of segments to stretch the band located in the band-receiving area until the container contacts the first set of segments whereupon the first set of segments moves downward within the second set of segments and the band moves in engagement with the container adjacent the peripheral end.

Other objects and further scope of applicability of the present invention will become apparent from the detailed description given hereinafter; it should be understood, however, that the detailed description, while indicating preferred embodiments of the invention, is given by way of illustration only since various changes and modifications within the spirit and scope of the invention will become apparent to those skilled in the art from this detailed description.

BRIEF DESCRIPTION OF THE DRAWINGS

FIG. 1 is an elevational view, partly cross-sectional, of an apparatus made in accordance with the present invention;

FIGS. 2 and 3 are similar elevational views showing two successive steps in the band insertion steps;

FIG. 4 is a top plan view of the apparatus shown in FIG. 1; and

FIG. 5 is a perspective view showing part of a can on which a band has been inserted.

DESCRIPTION OF PREFERRED EMBODIMENTS

Referring to FIGS. 1 and 4, there is shown an apparatus, generally denoted 10, for insertion of a resilient plastic band 12 onto a cylindrical container shown in dotted lines 14. The apparatus includes a structural frame that may consist, as shown, of a horizontal base 16 and of four uprights 18. A support member 20, centrally located on the frame and having an inverted frusto-conical body is mounted at the upper end of an elongated shaft 22 having its lower end extending through base 16. Support member 20 has a circular top wall 24 of a diameter smaller than that of the cylindrical container 14. A first set of segments 26 is arranged circumferentially about the support member, each segment having a top face 27 extending below the top wall 24 of the support member. The inner wall of each segment is tapered to correspond to the taper of the side wall of the frusto-conical body of support member 20.

A second set of segments 28 is arranged circumferentially about the first set of segments 26. Again, the top wall 29 of the segments 28 are disposed below the top face 27 of the segments 26 to thereby define therebetween an area in which may be placed the band 12 as shown in FIG. 1. Each segment 28 is mounted for sliding movement on a horizontally extending pin 30 which is fixed at one end to an upright 18, the opposite end being received in a vertically extending slot 32 provided in the outer wall of each segment 26. A small spring 34 is coaxially mounted on each pin 30 to urge segment 28 against the outer wall of segment 26.

A spring 36 is coaxially mounted on shaft 22 and has its upper end bearing against the bottom face of the support member 20 and its lower end bearing against base 16 of the frame structure. A second spring 38 of larger diameter than that of spring 36 is also coaxially mounted to shaft 22 and has its lower end bearing against base 16 and its upper end acting on the segments 26.

The method of operation of the apparatus of the present invention will now be given. The assembly shown in FIG. 1 is in a non-operating condition with the container 14 resting on top wall 24 of the support member 20. A plastic band 12 is positioned to sit on top face 29 of segments 28, its inner side wall resting against the upper outer wall of segments 26. Container 14 is forced downward by manual or mechanical force (as indicated by arrow 40), the side wall of support member 20 sliding against the inner wall of segments 26. This action forces segments 26 radially outwardly causing band 12 to be stretched. In so doing, spring 36 is compressed; however, spring 38 having a modulus higher than that of spring 36, downward movement of segments 26 is opposed. As segments 26 move radially, they also move segments 28 radially on pins 30, compressing springs 34. Downward movement of support member 20 continues until the bottom wall of container 14 reaches the top wall 27 of segments 26 (see FIG. 2). There, continued downward movement of container 14 causes vertical displacement of the segments 26, the latter in their outermost radial position. Segments 28 are prevented to move downward by pins 30 anchored in uprights 18. Segments 26 together with the lower peripheral rim of container 14 are received within the upper peripheral edges of segments 28 (see FIG. 3). At the same time, the band sitting on the top wall 29 of segments 28 in stretched condition frees the rim portion of the container and compresses into engagement with the lower peripheral end of the container. The downward movement of segments 26 compresses spring 38. With band now on the container, the downward force on the container is relieved and springs 38, 36 and 34, in succession, return the support member 20, segments 26 and segments 28 to their original position, shown in FIG. 1.

In order to limit the upward return movement of the support, member 20 and of its shaft 22, the latter is equipped, at its lower end, with a flange 44 which abuts the under surface of base of the frame. Other means of limiting the return movement of the support member are possible; therefore, the one illustrated in the drawings should not be limitative. The upward movement of segments 26 is limited by anchored pins 30 contacting the bottom wall 46 of slots 32.

To reduce the friction between spring 38 and the bottom wall of segments 26 in the first downward step of band-insertion procedure, a ring 48 is located beneath the underface of segments 26; this ring has a peripheral groove 56 in which is housed the upper turn of spring 38. On the top face of ring 48, another groove receives a ball-bearing arrangement which slidably contacts the underface of segments 26.

Although the invention has been described with respect to one specific form of the invention, it will be evident to the man skilled in the art that it may be refined and modified in various ways. It is therefore wished to have it understood that the present invention is not limited in interpretation excepts by the terms of the following claims.

The embodiments of the invention in which an exclusive property or privilege is claimed are defined as follows:

1. In combination with a container and a resilient band, an apparatus for inserting said band on said container adjacent one peripheral end thereof, comprising: a support member adapted to receive thereon said container and adapted to be forced downward by said container, said support member having a tapered side wall and a top wall of a size smaller than that of the peripheral end of said container; a first set of segments arranged circumferentially about said support member, each segment having a top wall extending below said top wall of said support member and an inner wall in sliding contact with said side wall of said support member, said segments being radially displaceable relative to said support member as said support member is forced downward; a second set of segments arranged circumferentially about said first set of segments, each segment of said second set having a top wall extending below the top wall of the segments of said first to define therewith a band-receiving area; means urging said second set of segments exteriorly against said first set of segments; first spring means opposing downward movement of said support member; second spring means opposing downward movement of said first set of segments, said second spring means having a spring modulus higher than that of said first spring means whereby downward movement of said container on said support member causes, first, a radial movement only of said first set of segments to stretch said band located in said band-receiving area until said container contacts said first set of segments whereupon said first set of segments moves downward within said second set of segments and the stretched band moves in engagement with the said container adjacent said peripheral end.

2. An apparatus as defined in claim 1, comprising a frame, an elongated shaft mounting said support member to said frame; and stop means on said shaft for limiting upward vertical displacement of said support member relative to said frame.

3. Apparatus as defined in claim 2, wherein said first spring means and said second spring means are mounted coaxially about said elongated shaft; said first spring means being disposed between said support member and said frame; said second spring means being disposed between said first set of segments and said frame.

4. An apparatus as defined in claim 3, further comprising friction limiting means between said first set of segments and said second spring means to facilitate the radial displacement of said first set of segments relative to said second spring means.

5. An apparatus as defined in claim 2, wherein said second set of segments are slidably mounted on horizontally extending pin means; said means urging said second set of segments consisting of springs coaxially mounted on said pin means between said frame and said segments of said second set; said pin means having one end fixedly mounted to said frame and the other end received in vertically extending outer slots in said segments of said first set; said slots being so dimensioned as to allow radial and vertical displacement of said first set of segments relative to said pin means.

6. An apparatus as defined in claim 1, wherein said support member has an inverted frusto-conical shape, the diameter of the top wall being smaller than that of said container positioned thereon.

* * * * *